United States Patent
Furukawa

(10) Patent No.: US 9,733,726 B2
(45) Date of Patent: Aug. 15, 2017

(54) PROJECTOR AND METHOD FOR CONTROLLING PROJECTOR

(71) Applicant: Seiko Epson Corporation, Tokyo (JP)

(72) Inventor: Tatsuya Furukawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/944,650

(22) Filed: Nov. 18, 2015

(65) Prior Publication Data

US 2016/0154472 A1    Jun. 2, 2016

(30) Foreign Application Priority Data

Dec. 1, 2014  (JP) ................................ 2014-242874

(51) Int. Cl.
*G06F 3/03* (2006.01)
*H04N 9/31* (2006.01)
*G06F 3/042* (2006.01)

(52) U.S. Cl.
CPC .......... *G06F 3/0304* (2013.01); *G06F 3/0425* (2013.01); *H04N 9/3179* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| 2012/0314115 A1* | 12/2012 | Suga ................ | G03H 1/2205 348/333.1 |
| 2013/0016070 A1* | 1/2013 | Starner .............. | G02B 27/017 345/175 |
| 2013/0050426 A1* | 2/2013 | Sarmast ............. | G01S 17/89 348/46 |

FOREIGN PATENT DOCUMENTS

| JP | 2014-74825 A | 4/2014 |
|---|---|---|
| JP | 2014-131326 A | 7/2014 |

* cited by examiner

*Primary Examiner* — Jospeh Haley
*Assistant Examiner* — Emily Frank
(74) *Attorney, Agent, or Firm* — ALG Intellectual Property, LLC

(57) ABSTRACT

A projector acquires the distance from the projector to a screen. When the acquired distance is short, the projector increases the shutter speed of an electronic shutter of an imaging section, whereas when the acquired distance is long, the projector decreases the shutter speed of the electronic shutter of the imaging section. A pointer outputs infrared light for a predetermined period, and the imaging section of the projector captures the infrared light outputted by the pointer at the set shutter speed and identifies the position of the pointer.

12 Claims, 10 Drawing Sheets

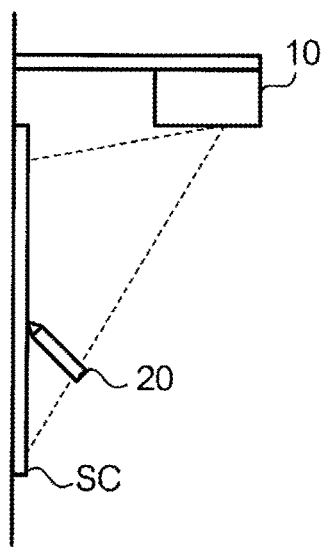 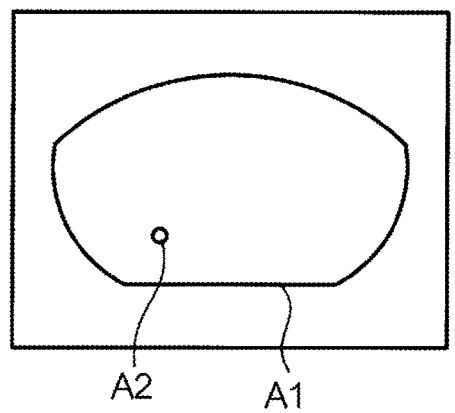
FIG. 7A  FIG. 7B
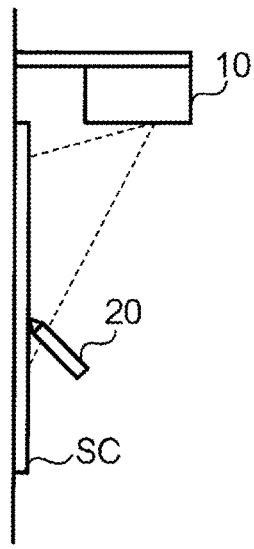 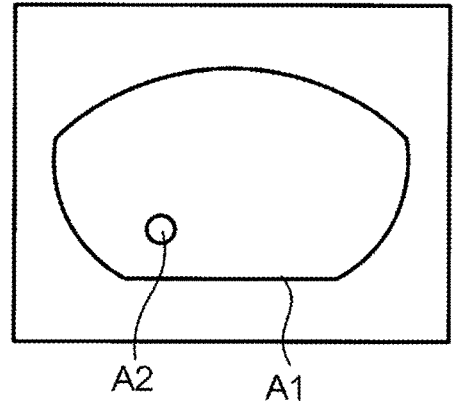
FIG. 8A  FIG. 8B

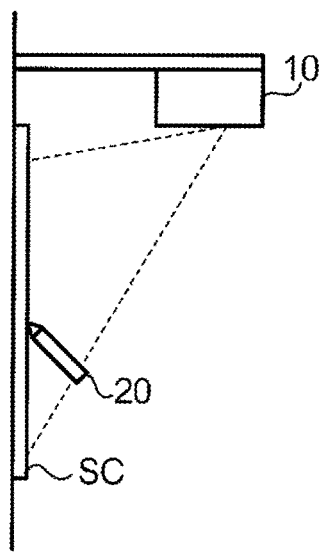
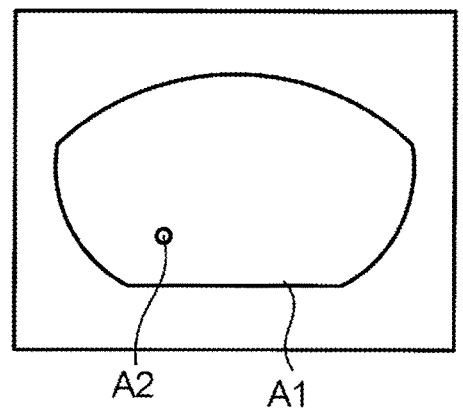
FIG. 9A  　　　　　FIG. 9B
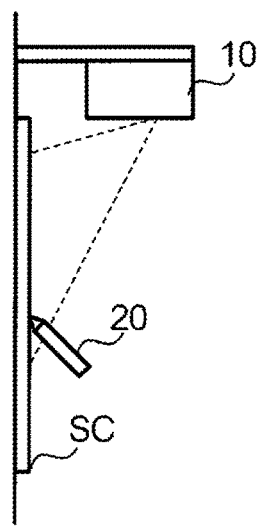
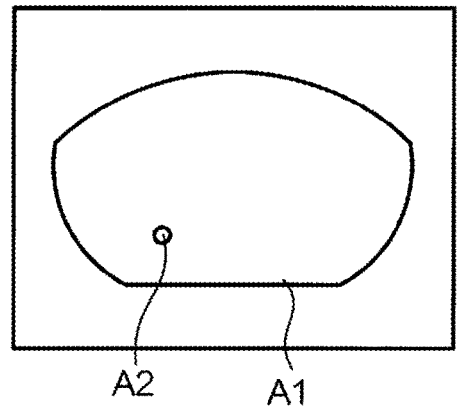
FIG. 10A  　　　　　FIG. 10B

PROJECTOR AND METHOD FOR CONTROLLING PROJECTOR

The entire disclosure of Japanese Patent Application No. 2014-242874, filed Dec. 1, 2014 is expressly incorporated by reference herein.

BACKGROUND

1. Technical Field

The present invention relates to a projector and a method for controlling the projector.

2. Related Art

As an invention relating to detection of the position of a pointer that points a projected image, JP-A-2014-74825, for example, discloses a projector. The projector is so configured that an imaging section thereof captures an image of an area including an image projected on a projection surface. When a light emitting pen that is the pointer is present on the projection surface, infrared light emitted by the light emitting pen from a light emitting diode is captured with the imaging section. The projector analyzes an image generated by the capturing operation to detect the position of the light emitting pen on the projection surface. When the light emitting pen is moved and an image of a line that connects the positions of the moved light emitting is projected, an image of a line corresponding to the trajectory along which the light emitting pen has been moved can be projected.

The projector can adjust the area of projected video images by adjustment of the distance to the projection surface. When the distance from the projector to the projection surface is prolonged, the size of a projected image increases, whereas when the distance from the projector to the projection surface is shortened, the size of a projected image decreases. When the distance from the projector to the projection surface is shortened, the distance to the light emitting pen, which points the projection surface, is also shortened, and when the distance from the light emitting pen to the projector is shortened, a light flux incident on the imaging section per unit area increases. When the light flux incident on the imaging section increases, the projector, which detects the region of the light emitted by the light emitting pen on an image captured by the imaging section to locate the position of the light emitting pen, undesirably detects a larger region as the region of the emitted light than an actual region. When a larger region than an actual region is detected as the region of the emitted light, as described above, the position of the light emitting pen is detected with lower accuracy.

SUMMARY

An advantage of some aspects of the invention is to accurately detect the position of a pointer even when the distance over which a projector performs projection is changed.

An aspect of the invention provides a projector including a projection section that projects video images, an imaging section that generates an image of a projection surface which is pointed with a pointer and on which the video images are projected, a position detection section that detects a position of the pointer based on the image generated by the imaging section, an acquisition section that acquires information on a distance to the pointer or the projection surface, and a change section that changes an imaging parameter relating to brightness of the image generated by the imaging section in accordance with the information acquired by the acquisition section.

According to the projector, the position of the pointer can be detected with high accuracy even when the distance over which the projector performs projection is changed.

In the aspect of the invention, the imaging parameter may be changed in such a way that the brightness of the image generated by imaging section increases as the distance to the pointer or the projection surface increases.

According to the configuration described above, the brightness of an image used to detect the position of the pointer increases as the distance over which the projector performs projection is increased, whereby the position of the pointer can be detected with high accuracy.

In the aspect of the invention, the imaging parameter may be a light exposure period for which the imaging section performs imaging.

According to the configuration described above, the brightness of an image used to detect the position of the pointer is adjusted even when the distance over which the projector performs projection is changed, whereby the position of the pointer can be detected with high accuracy.

In the aspect of the invention, the imaging parameter may be a gain in accordance with which the imaging section performs imaging.

According to the configuration described above, the brightness of an image used to detect the position of the pointer is adjusted even when the distance over which the projector performs projection is changed, whereby the position of the pointer can be detected with high accuracy.

In the aspect of the invention, the imaging parameter may be a diameter of an opening of an aperture that limits light incident on the imaging section.

According to the configuration described above, the brightness of an image used to detect the position of the pointer is adjusted even when the distance over which the projector performs projection is changed, whereby the position of the pointer can be detected with high accuracy.

In the aspect of the invention, the projector may further include a measurement section that measures the distance, and the change section may change the imaging parameter in accordance with the distance measured by the measurement section.

According to the configuration described above, the brightness of an image used to detect the position of the pointer is adjusted in accordance with the measured distance, whereby the position of the pointer can be detected with high accuracy.

In the aspect of the invention, the measurement section may measure a distance to the projection surface.

According to the configuration described above, the brightness of an image used to detect the position of the pointer is adjusted in accordance with the distance from the projector to the projection surface, whereby the position of the pointer can be detected with high accuracy.

In the aspect of the invention, the measurement section may measure a distance to the pointer.

According to the configuration described above, the brightness of an image used to detect the position of the pointer is adjusted in accordance with the distance from the projector to the pointer, whereby the position of the pointer can be detected with high accuracy.

In the aspect of the invention, the change section may change the imaging parameter in accordance with a position detected with the position detection section.

According to the configuration described above, the brightness of an image used to detect the position of the pointer is adjusted in accordance with the position of the pointer, whereby the position of the pointer can be detected with high accuracy.

Another aspect of the invention provides a projector including a projection section that projects video images, an imaging section that generates an image of a projection surface which is pointed with a pointer and on which the video images are projected, a position detection section that detects a position of the pointer based on the image generated by the imaging section, and a change section that changes an imaging parameter relating to brightness of the image generated by the imaging section in such a way that in the image generated by the imaging section, an area of a region of light emitted by the pointer falls within a range specified in advance.

According to the projector, the position of the pointer can be detected with high accuracy even when the distance over which the projector performs projection is changed.

Still another aspect of the invention provides a method for controlling a projector, the method including generating an image of a projection surface which is pointed with a pointer and on which video images are projected, detecting a position of the pointer based on the image generated in the generating of an image, acquiring information on a distance to the pointer or the projection surface, and changing an imaging parameter relating to brightness of the image generated in the generating of an image in accordance with the information acquired in the acquiring of information.

According to the method, the position of the pointer can be detected with high accuracy even when the distance over which the projector performs projection is changed.

Yet another aspect of the invention provides a method for controlling a projector, the method including generating an image of a projection surface which is pointed with a pointer and on which video images are projected, detecting a position of the pointer based on the image generated in the generating of an image, and changing an imaging parameter relating to brightness of the image generated in the generating of an image in such a way that in the image generated in the generating of an image, an area of a region of light emitted by the pointer falls within a range specified in advance.

According to the method, the position of the pointer can be detected with high accuracy even when the distance over which the projector performs projection is changed.

BRIEF DESCRIPTION OF THE DRAWINGS

The invention will be described with reference to the accompanying drawings, wherein like numbers reference like elements.

FIGS. 7A and 7B show an example of an image captured with an imaging section.

FIGS. 8A and 8B show another example of the image captured with the imaging section.

FIGS. 9A and 9B show another example of the image captured with the imaging section.

FIGS. 10A and 10B show another example of the image captured with the imaging section.

DESCRIPTION OF EXEMPLARY EMBODIMENTS

First Embodiment
Configuration of First Embodiment

Figure 1:
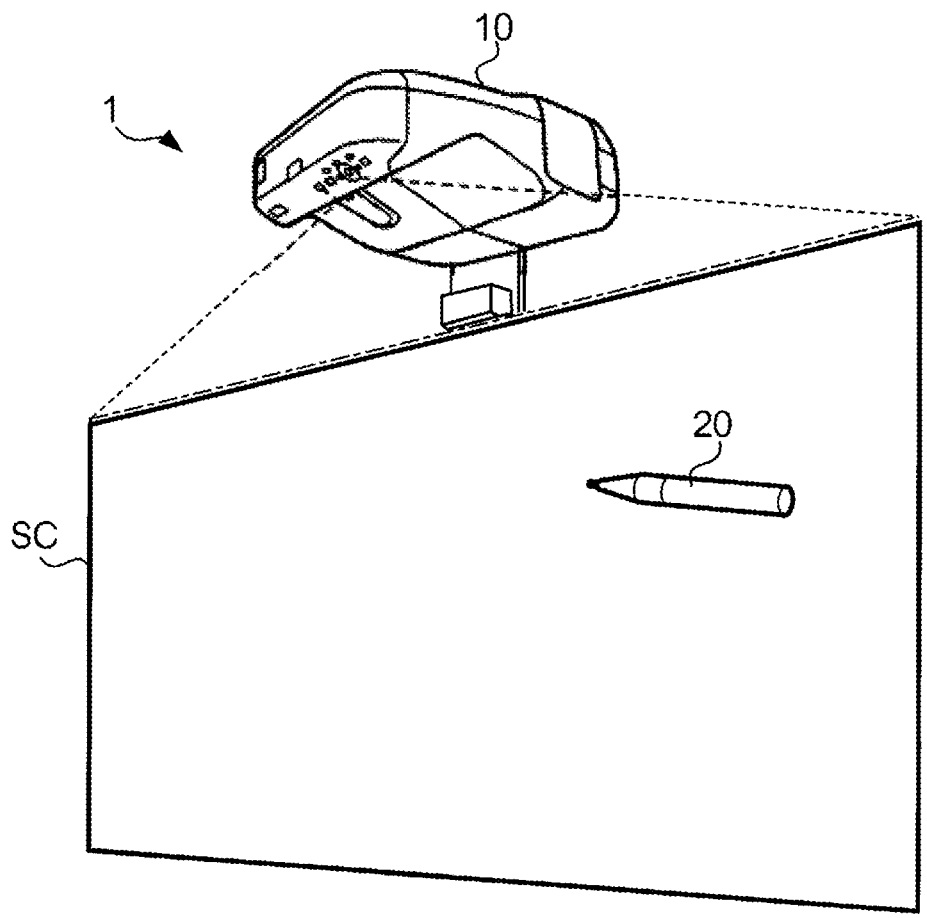
FIG. 1 shows an apparatus that forms a display system.

FIG. 1 shows an apparatus that forms a display system 1 according to an embodiment of the invention. The display system 1 includes a projector 10, which projects video images on a screen SC (projection surface), and a pointer 20.

The projector 10 is connected to an external apparatus that supplies a video signal, and the projector 10 projects video images represented by the video signal supplied from the external apparatus on the screen SC. The projector 10 is installed in a position obliquely upward from the screen SC and projects the video images toward the screen SC. In the present embodiment, the projector 10 projects the video images on the screen SC but may instead project the video images on a wall surface instead of the screen SC. Further, the projector 10 has what is called a whiteboard function of detecting the position of the pointer 20 to identify the trajectory along which the pointer is moved and projecting video images corresponding to the trajectory along which the pointer has been moved.

The pen-shaped pointer 20 functions as a pointing device and is used when a user manipulates a GUI (graphical user interface) projected by the projector 10 and when the user uses the whiteboard function.

Figure 2:
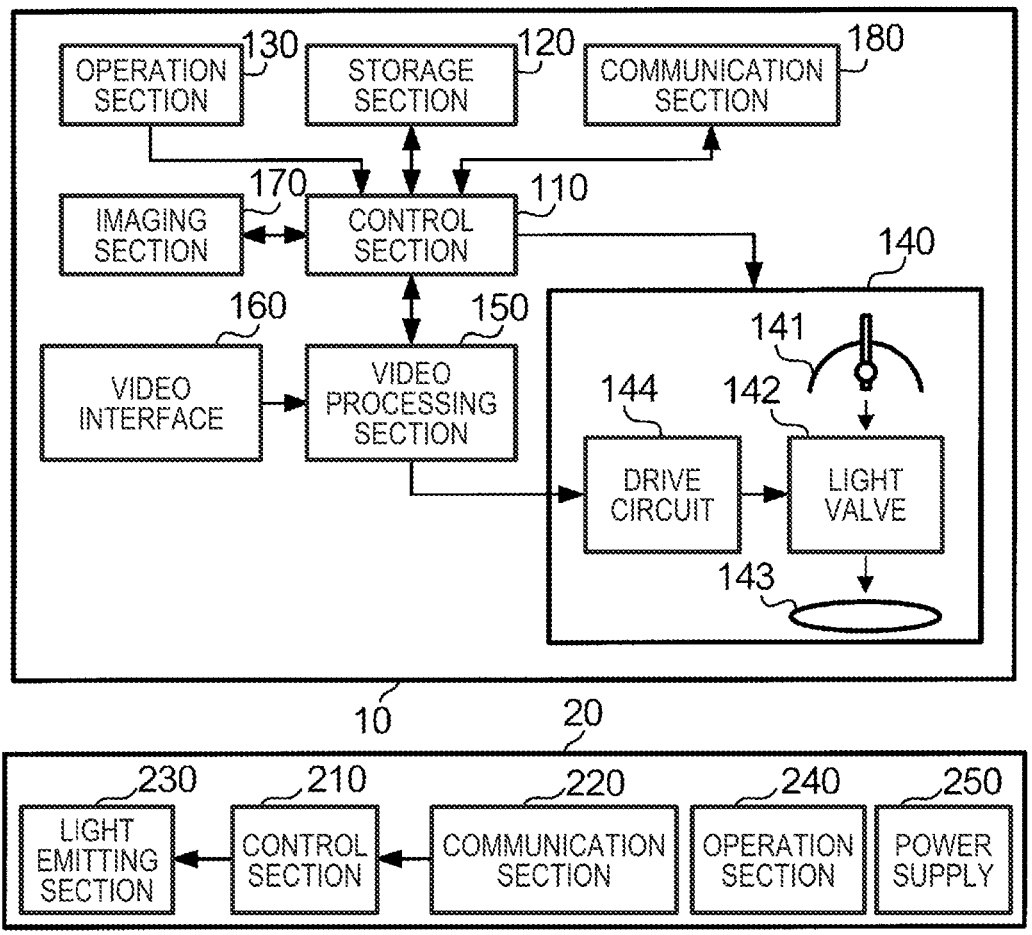
FIG. 2 shows hardware configurations of a projector and a pointer.

FIG. 2 shows hardware configurations of the projector 10 and the pointer 20. The pointer 20 includes a control section 210, a communication section 220, a light emitting section 230, an operation section 240, and a power supply 250. The power supply 250 is, for example, a dry battery or a secondary battery and supplies the control section 210, the communication section 220, the light emitting section 230, and the operation section 240 with electric power. The operation section 240 includes a switch (not shown) that controls the supply of the electric power from the power supply 250 to each of the sections. When the switch on the operation section 240 is turned on, the power supply 250 supplies each of the sections with electric power, whereas when the switch on the operation section 240 is turned off, the power supply 250 stops supplying each of the sections with electric power. The light emitting section 230 includes a light emitting diode that emits infrared light. Turning the light emitting section 230 on and off is controlled by the control section 210. The communication section 220 includes a light receiving device that receives infrared light. The communication section 220 receives an infrared-light sync signal issued by the projector 10. The communication section 220 converts the received sync signal into an electric signal and supplies a control section 110 with the electric signal. The control section 210 is connected to the light emitting section 230 and the communication section 220.

When triggered by the sync signal supplied from the communication section 220, the control section 210 starts controlling the light emitting section 230 to control turning the light emitting diode of the light emitting section 230 on and off.

The projector 10 includes a control section 110, a storage section 120, an operation section 130, and a projection section 140. The projector 10 further includes a video processing section 150, a video interface 160, an imaging section 170, and a communication section 180. The control section 110 is a microcomputer including a CPU (central processing unit), a ROM (read only memory), and a RAM (random access memory). When the CPU executes a program stored in the ROM, the control section 110 controls each of the sections to achieve a variety of functions, such as the function of projecting video images on the screen SC and the whiteboard function, in the projector 10. The storage section 120 stores setting values relating to the image quality of projected video images and information on settings of the variety of functions.

The operation section 130 includes a plurality of buttons that allow operation of the projector 10. The control section 110 controls each of the sections in accordance with an operated button for adjustment of video images projected on the screen SC, setting of the variety of functions provided by the projector 10, and other types of operation. The operation section 130 further includes a light receiving section (not shown) that receives an infrared light signal from a remote control (not shown). The operation section 130 converts the signal transmitted from the remote control into an electric signal and supplies the control section 110 with the electric signal, and the control section 110 controls each of the sections in accordance with the supplied signal.

The video interface 160 has an RCA connector, a D-sub connector, an HDMI (registered trademark) connector, and other connectors and supplies the video processing section 150 with a video signal supplied from the external apparatus to the connector. The video interface 160 may have an interface for wireless communication, such as wireless LAN and Bluetooth (registered trademark), and acquire a video signal via wireless communication.

The video processing section 150 acquires the video image signal supplied from the video interface 160. The video processing section 150 further acquires an on-screen image signal that allows display of a GUI for operation of the projector 10, the state of the projector 10, and other types of information from the control section 110. The video processing section 150 includes a variety of image processing functions and performs image processing on the video signal supplied from the video interface 160 to adjust the image quality of video images to be projected. When the on-screen image signal is supplied from the control section 110, the video processing section 150 supplies a video signal on which the on-screen image signal has been superimposed to the projection section 140.

The projection section 140, which projects video images, includes a light source 141, a light valve 142, a drive circuit 144, and a projection system 143. The light source 141 is a lamp that emits light. The light emitted from the light source 141 is separated by a plurality of dichroic mirrors and reflection mirrors that are not shown into red light, green light, and blue light, and the separated red light, green light, and blue light are guided to the light valve 142. The light source 141 is not necessarily a lamp and may instead be a light emitting diode or a semiconductor laser device that emits laser light.

The drive circuit 144 acquires the video signal supplied from the video processing section 150. The video signal supplied to the drive circuit 144 has grayscale data representing the grayscale of the red component in video images to be projected, grayscale data representing the grayscale of the green component in the video images to be projected, and grayscale data representing the grayscale of the blue component in the video images to be projected. The drive circuit 144 extracts the grayscale data on the color components of the red, green, and blue light components and drives the light valve 142 based on the extracted grayscale data on the color components.

The light valve 142 is formed of a liquid crystal light valve on which the red light described above is incident, a liquid crystal light valve on which the green light described above is incident, and a liquid crystal light valve on which the blue light described above is incident. Each of the liquid crystal light valves is a transmissive liquid crystal panel and has pixels arranged in a matrix having a plurality of rows and a plurality of columns. The liquid crystal light valve on which the red light is incident is driven based on the red grayscale data, the liquid crystal light valve on which the green light is incident is driven based on the green grayscale data, and the liquid crystal light valve on which the blue light is incident is driven based on the blue grayscale data. In each of the liquid crystal light valves, the drive circuit 144 controls each of the pixels to change the transmittance of the pixel. When the transmittance of each of the pixels is controlled, each of the color light components having passed through the corresponding liquid crystal light valve forms video images corresponding to the grayscale data on the color light component. The video images formed by the red light, the green light, and the blue light having passed through the liquid crystal light valves are combined with one another by a dichroic prism that is not shown, and the combined light is incident on the projection system 143. The projection system 143, which is an optical system that enlarges video images incident thereon, enlarges the incident video images and projects the enlarged video images via lenses and mirrors on the screen SC.

The imaging section 170 includes a CMOS imaging device that receives the infrared light emitted from the light emitting section 230, an optical system that focuses an image on the imaging device, an aperture that limits the light incident on the imaging device, and other components. The imaging device 170 performs imaging within a range including the screen SC, generates an image of an imaged range, and outputs an image signal representing the generated image. The imaging section 170 has imaging parameters relating to brightness of the generated image, and the control section 110 sets the imaging parameters. The imaging section 170 has an electronic shutter function which causes the control section 110 to set the shutter speed, which is an example of the imaging parameters, so that the control section 110 controls the light exposure period over which the imaging device operates. The communication section 180 includes a light emitting diode that emits infrared light. The communication section 180, the light emitting diode of which is turned on and off by the control section 110, transmits the infrared-light sync signal.

Figure 3:
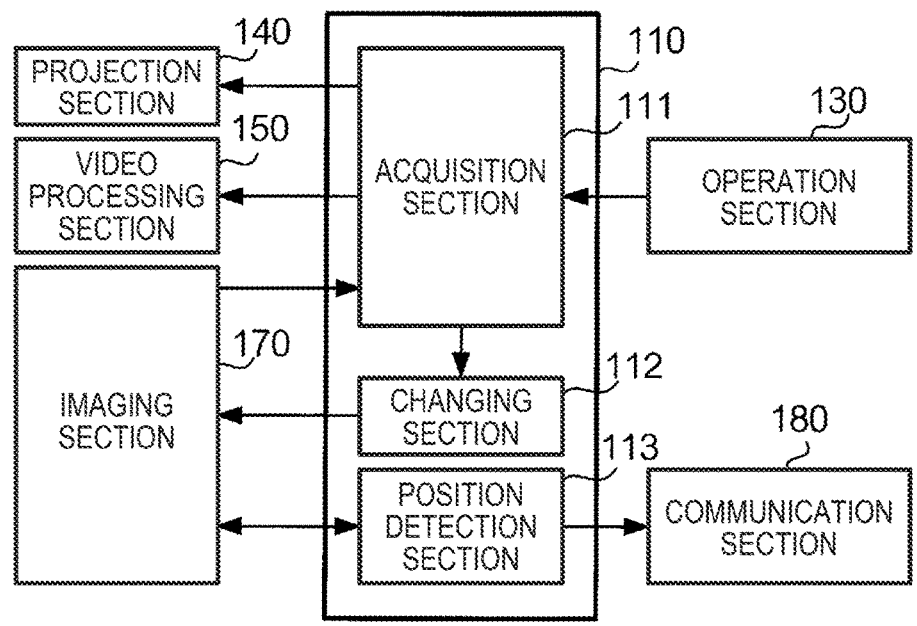
FIG. 3 is a functional block diagram showing the configuration of functions achieved in a control section.

FIG. 3 is a functional block diagram showing the configuration of functions achieved when the control section 110 executes the program.

An acquisition section 111 acquires the distance from the projector 10 to the screen SC. Specifically, the acquisition section 111 controls the video processing section 150 and the projection section 140 to cause them to project a pattern image for measuring the distance from the projector 10 to the screen SC on the screen SC. When the pattern image is projected on the screen SC, the imaging section 170 captures the projected pattern image and outputs an image signal representing the pattern image. The acquisition section 111 acquires the image signal representing the pattern image and analyzes the acquired image signal to acquire the distance from the projector 10 to the screen SC. That is, the acquisition section 111 also functions as a measurement section that measures the distance from the projector 10 to the screen SC. A method for determining the distance from the projector 10 to the screen SC based on an image represented by the acquired image signal is, for example, a method using a known technology, such as the technology disclosed in JP-A-2014-131326. Instead of measuring the distance from the projector 10 to the screen SC, the acquisition section 111 may acquire information on a distance inputted by the user's operation of the remote control or the operation section 130. In this case, the information that the acquisition section 111 should acquire is not limited to the distance itself and only needs to be information on the distance (information corresponding to the distance). For example, when the projector 10 has no zooming function, the image size is determined by the distance from the projector 10 to the screen SC, and the user may therefore be prompted to input an image size as the information on the distance.

A change section 112 sets the shutter speed of an electronic shutter of the imaging section 170 based on the distance acquired by the acquisition section 111. Specifically, the change section 112 inputs the acquired distance into a calculation formula specified in advance and uses the calculation formula to acquire the shutter speed of the imaging section 170. Instead of the calculation formula, a lookup table that stores distances and shutter speeds related to each other may be used to acquire the shutter speed.

Figure 4:
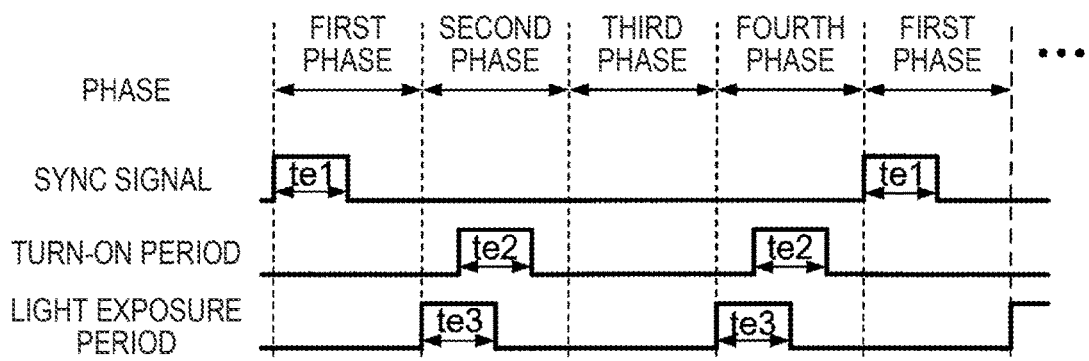
FIG. 4 shows an example of a time chart in accordance with which the position of the pointer is detected.

A position detection section 113 detects the position of the pointer 20 based, for example, on a time chart shown in FIG. 4. A period for detecting the position of the pointer 20 is formed of four phases, a first phase to a fourth phase. To detect the position of the pointer 20, the first to fourth phases are repeated. The first phase is a phase for synchronizing the timing at which the projector 10 causes the imaging section 170 to perform imaging with the timing at which the pointer 20 emits light. In the first phase, the position detection section 113 controls the communication section 180 to cause it to output the infrared-light sync signal for a predetermined period tel. In the pointer 20, the communication section 220 receives the sync signal, and the control section 210, after a predetermined time elapses since the sync signal was received, controls the light emitting section 230 to be turned on for a predetermined period tet. In the present embodiment, the light emitting section 230 is controlled to be turned on in the second phase and the fourth phase at a point of time when time specified in advance elapses after each of the phases starts.

The position detection section 113 controls the imaging section 170 in the second phase and the fourth phase to cause it to capture an image of a predetermined range including the screen SC at the set shutter speed. When the pointer 20 is located in the predetermined range, which is the imaging range, the captured image contains the light emitted by the light emitting section 230. A light exposure period tea, in which the imaging section 170 is exposed to light based on the electronic shutter function, starts from the point of time when the second phase and the fourth phase start, and the point of time when the light exposure ends is determined by the shutter speed set by the change section 112. An image signal carrying an image captured by the imaging section 170 in each of the second and fourth phases is supplied to the position detection section 113. The position detection section 113 analyzes the supplied image signal, identifies the position of the light emitted by the light emitting section 230, and sets the identified position to be the position of the pointer 20. The identified position is used as the position of the pointer 20 when the pointer 20 is used as a pointing device.

Example of Action in First Embodiment

A description will next be made of an example of the action performed when the shutter speed of the imaging section 170 is set in the first embodiment.

Figure 5:
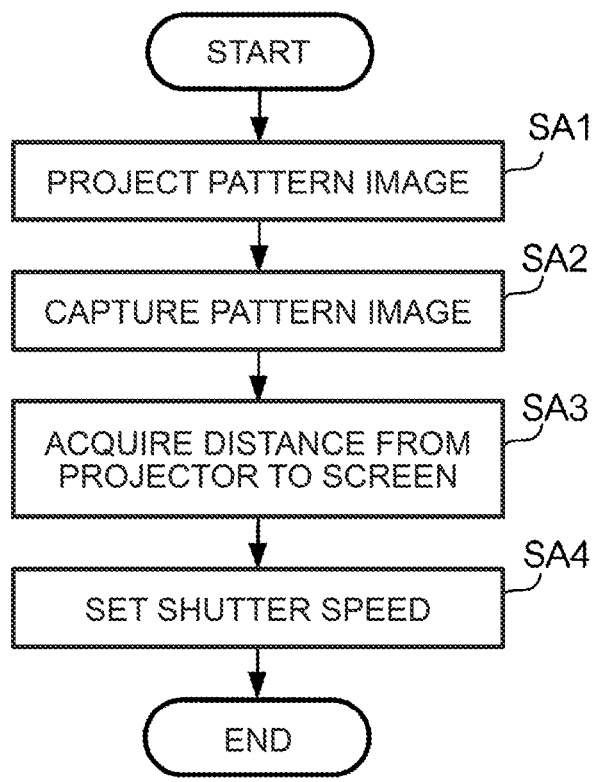
FIG. 5 is a flowchart showing the procedure of processes carried out by the control section.

FIG. 5 is a flowchart showing the procedure of processes carried out when the control section 110 sets the shutter speed of the imaging section 170. First, when the user operates the remote control to issue an instruction to carry out the process of measuring the distance from the projector 10 to the screen SC, the control section 110 controls the video processing section 150 to cause it to project the pattern image for measuring the distance on the screen SC (step SA1).

After the pattern image is projected on the screen SC, the control section 110 controls the imaging section 170 to cause it to capture the pattern image (step SA2). After the imaging section 170 captures the pattern image, an image signal representing the pattern image is outputted to the control section 110. The control section 110 analyzes the image signal supplied from the imaging section 170 to determine the distance from the projector 10 to the screen SC (step SA3). A method for capturing an image for distance measurement and determining the distance from the projector 10 to the screen SC is, for example, a method based on the technology disclosed in JP-A-2014-131326. The distance from the projector 10 to the screen SC may instead be obtained by providing the projector 10 with a distance sensor and using a result of measurement performed by the distance sensor.

Having acquired the distance from the projector 10 to the screen SC, the control section 110 sets the shutter speed of the imaging section 170 (step SA4). Specifically, the control section 110 inputs the acquired distance into a calculation formula specified in advance and uses the calculation formula to acquire the shutter speed of the imaging section 170. The shutter speed is increased when the distance from the projector 10 to the screen SC is short, whereas the shutter speed is decreased when the distance from the projector 10 to the screen SC is long. In other words, the control section 110 shortens the light exposure period for which the imaging section 170 operates in the second phase and the fourth phase, that is, the time for which the imaging device accumulates electric charge when the distance from the projector 10 to the screen SC is short, whereas prolonging the light exposure period when the distance from the projector 10 to the screen SC is long.

Figure 6A:
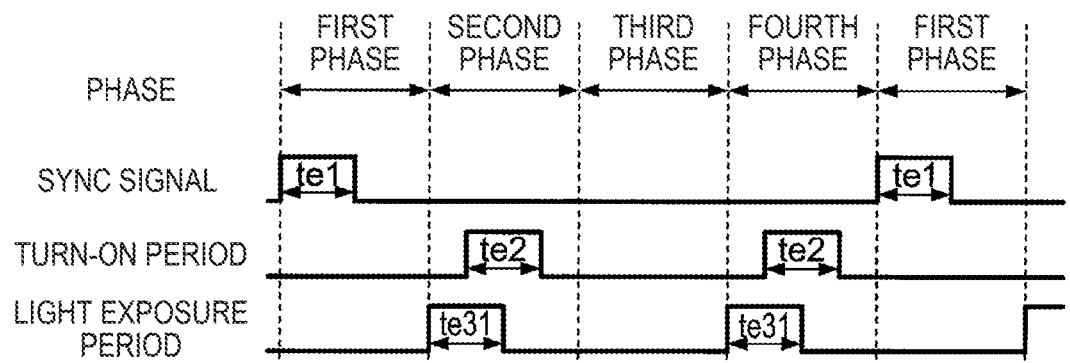
FIGS. 6A and 6B show examples of a time chart in accordance with which the position of the pointer is detected.
Figure 6B:
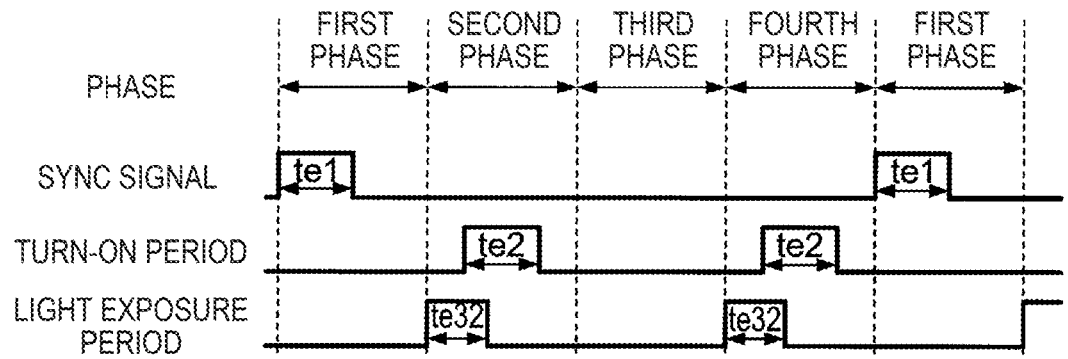

According to the thus set shutter speed, the light exposure period for which the imaging section 170 operates is set at a light exposure period te31, as shown in FIG. 6A, when the distance from the projector 10 to the screen SC is long, whereas the light exposure period for which the imaging section 170 operates is set at a light exposure period te32, which is shorter than the light exposure period te31, as shown in FIG. 6B, when the distance from the projector 10 to the screen SC is short.

In a configuration in which the shutter speed of the imaging section 170 is not changed in accordance with the distance from the projector 10 to the screen SC, that is, in a configuration different from the configuration of the present embodiment, and when the distance from the projector 10 to the screen SC is long as shown in FIG. 7A, the amount of light incident from the light emitting section 230 on the imaging device in the light exposure period decreases. Therefore, in an image of a projection region A1 captured with the imaging section 170, the area of a region A2 where the light emitted by the pointer 20 is displayed decreases, as shown in FIG. 7B. On the other hand, when the distance from the projector 10 to the screen SC is short as shown in FIG. 8A, the amount of light incident from the light emitting section 230 on the imaging device in the light exposure period increases. Therefore, in an image of the projection region A1 captured with the imaging section 170, the area of the region A2 where the light emitted by the pointer 20 is displayed increases, as shown in FIG. 8B. When the area of the region where the light emitted by the pointer 20 is displayed increases as described above, the position of the pointer 20 is detected with low accuracy.

In contrast, in the present embodiment, when the distance from the projector 10 to the screen SC is long as shown in FIG. 9A and a small amount of light is therefore incident from the light emitting section 230 on the imaging device, the shutter speed of the imaging section 170 is so set that an amount of light specified in advance is incident from the light emitting section 230 on the imaging device in the light exposure period, whereby in an image of the projection region A1 captured with the imaging section 170, the region A2 where the light emitted by the pointer 20 is displayed has a predetermined area, as shown in FIG. 9B.

On the other hand, when the distance from the projector 10 to the screen SC is short as shown in FIG. 10A and a large amount of light is therefore incident from the light emitting section 230 on the imaging device, the shutter speed of the imaging section 170 is so set that the amount of light specified in advance is incident from the light emitting section 230 on the imaging device in the light exposure period, whereby in an image of the projection region A1 captured with the imaging section 170, the region A2 where the light emitted by the pointer 20 is displayed has the predetermined area, which is equal to the area in FIG. 9B, as shown in FIG. 10B.

As described above, according to the present embodiment, even when the distance from the projector 10 to the screen SC is short, and when the imaging section 170 captures the light emitted by the pointer 20 on the screen SC, the region A2 where the light emitted by the pointer 20 is displayed has a predetermined area, whereby the position of the pointer 20 can be detected with high accuracy. Further, when the distance from the projector 10 to the screen SC is short, the shutter speed of the imaging section 170 is increased, whereby a situation in which infrared light other than the light from the light emitting section 230 is captured as noise can be avoided.

Figure 11A:
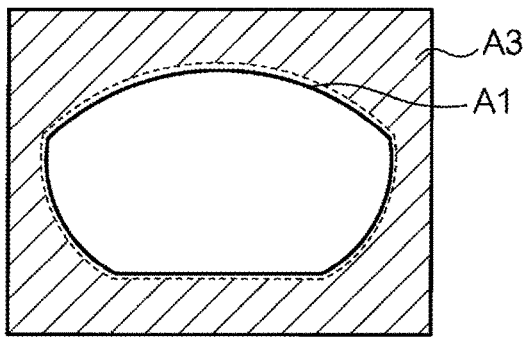
FIGS. 11A to 11C show an example of a mask region.

In the first embodiment, when the imaging section 170 receives light from in a region outside the projection region in addition to the light from the light emitting section 230, it is difficult to detect the position of the pointer 20. To avoid the situation described above, a mask region A3 may be so set that it surrounds a region slightly larger than the projection region (region indicated by dotted line in FIG. 11A) and an image generated by the imaging section 170 is masked by the mask region A3.

Figure 11B:
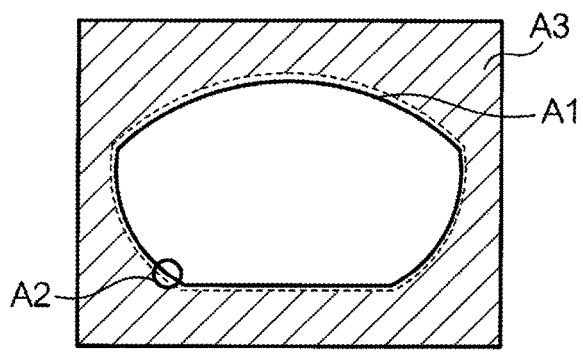
Figure 11C:
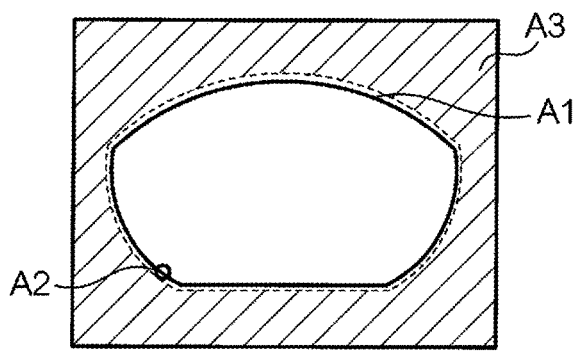

In a configuration different from the configuration in the present embodiment but provided with the mask region A3, the shutter speed is not set in accordance with the distance from the projector 10 to the screen SC. Therefore, when the area of the region A2 where the light emitted by the pointer 20 is displayed increases, and when the area A2 is located, for example, at the edge of the projection region A1 as shown in FIG. 11B, the mask region A3 undesirably masks the region A2, and it is therefore difficult to detect the position of the pointer 20 with high accuracy. The region A2 will not be masked if the mask region A3 is so set that it is separate from the projection region A1 by a greater amount. In this case, however, light from a region outside the projection region is likely to be received.

On the other hand, in the present embodiment, in which the shutter speed of the imaging section 170 is set in accordance with the distance from the projector 10 to the screen SC so that the region A2 is restricted to a small area, the region A2 is not masked by the mask region A3 even when the region A2 is located at the edge of the projection region A1, whereby the position of the pointer 20 can be detected with high accuracy.

Second Embodiment

A second embodiment of the invention will next be described. A projector 10 according to the second embodiment differs from the projector 10 according to the first embodiment in terms of the configuration for setting the shutter speed of the imaging section 170. In the following description, the same configurations as those in the first embodiment have the same reference characters and will not be described, and the difference from the first embodiment will be primarily described.

Figure 12:
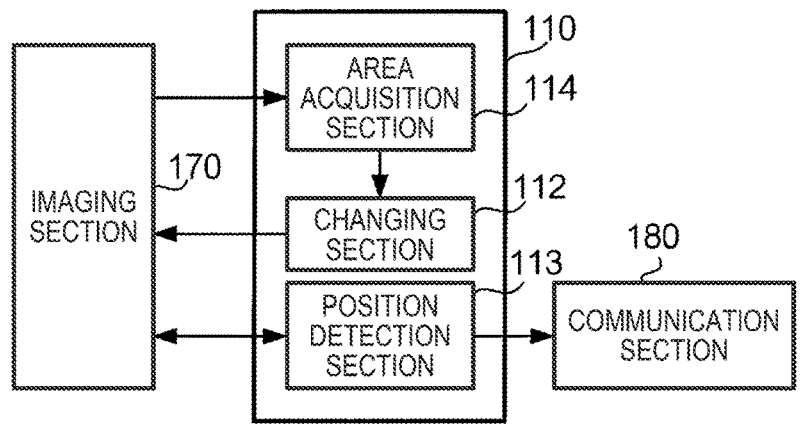
FIG. 12 is a functional block diagram showing the configuration of functions achieved in a second embodiment.

FIG. 12 is a functional block diagram showing the configuration of functions achieved in the control section 110. An area acquisition section 114 acquires an image signal outputted from the imaging section 170. The area acquisition section 114 analyzes an image represented by the acquired image signal to acquire the area of the region A2 where the light emitted by the pointer 20 is displayed.

A change section 112 changes the shutter speed of the electronic shutter of the imaging section 170 in accordance with the area of the region A2 acquired by the area acquisition section 114. When the area of the region A2 does not fall within an area range specified in advance and the area is greater than the upper limit of the range, the change section 112 increases the shutter speed of the imaging section 170, whereas when the acquired area does not fall within the area range specified in advance and the area is smaller than the lower limit of the range, the change section 112 decreases the shutter speed of the imaging section 170. When the acquired area of the region A2 falls within the area range specified in advance, the change section 112 does not change the shutter speed.

Example of Action in Second Embodiment

A description will next be made of an example of the action performed when the shutter speed of the imaging section 170 is set in the second embodiment.

Figure 13:
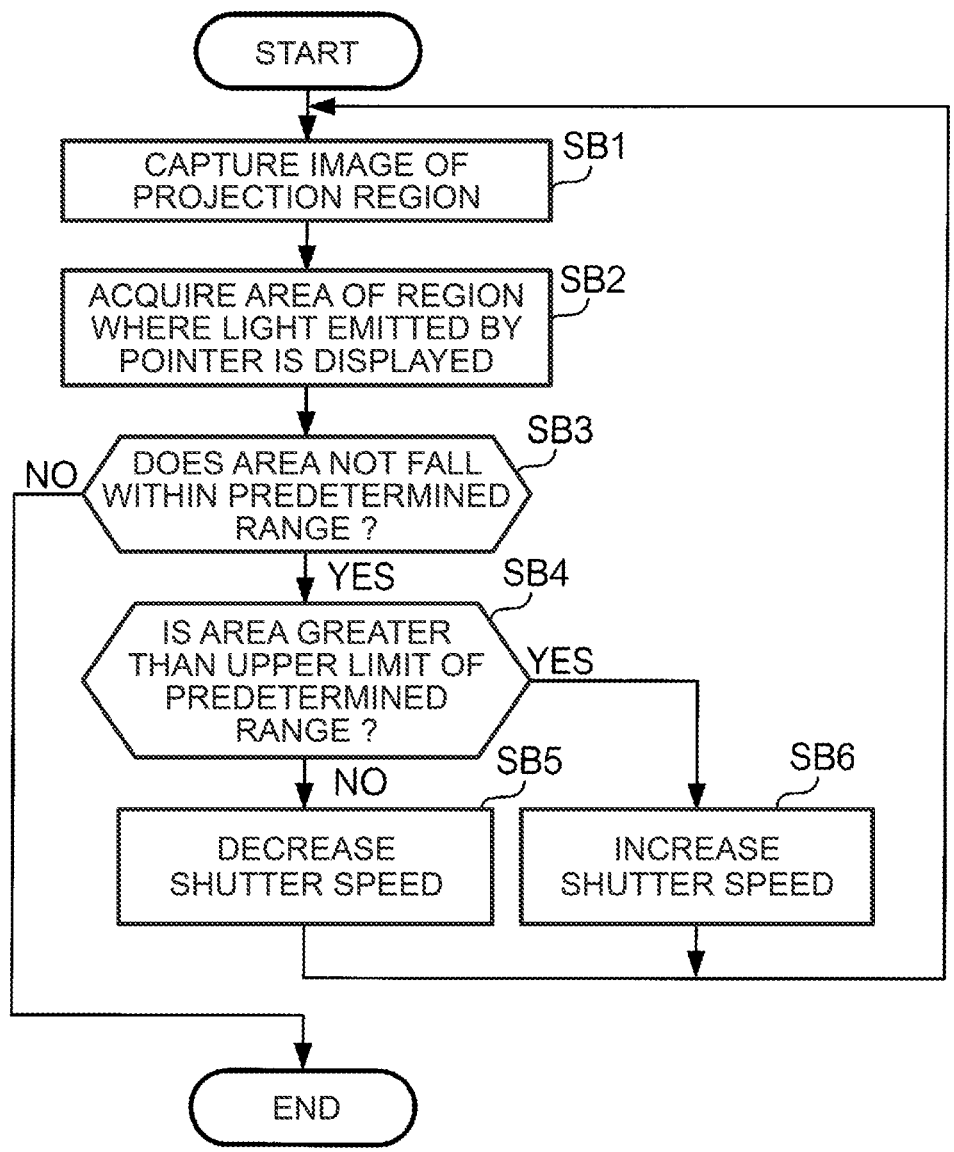
FIG. 13 is a flowchart showing the procedure of processes carried out by the control section in the second embodiment.

FIG. 13 is a flowchart showing the procedure of processes carried out when the control section 110 in the second embodiment sets the shutter speed of the imaging section 170. First, when the user operates the remote control to issue an instruction to carry out the process of adjusting the shutter speed, the control section 110 controls the imaging section 170 to cause it to capture an image of the projection region (step SB1). After the imaging section 170 captures an image of the projection region, an image signal is outputted to the control section 110. The control section 110 analyzes the image signal supplied from the imaging section 170 to acquire the area of the region A2 where the light emitted by the pointer 20 is displayed (step SB2).

When the acquired area does not fall within the area range specified in advance (YES in step SB3) and the area is greater than the upper limit of the range (YES in step SB4), the control section 110 increases the shutter speed of the imaging section 170 (step SB6) and returns the procedure of processes to step SB1. When the acquired area does not fall within the area range specified in advance and the area is smaller than the lower limit of the range (NO in step SB4), the control section 110 decreases the shutter speed of the imaging section 170 (step SB5) and returns the procedure of processes to step SB1. When the acquired area falls within the area range specified in advance (NO in step SB3), the control section 110 terminates the process of setting the shutter speed of the imaging section 170.

According to the present embodiment, even when the distance from the projector 10 to the screen SC is short, and when the imaging section 170 captures the light emitted by the pointer 20 on the screen SC, the region A2 where the light emitted by the pointer 20 is displayed has the predetermined area, whereby the position of the pointer 20 can be detected with high accuracy. Further, when the distance from the projector 10 to the screen SC is short, the shutter speed of the imaging section 170 is increased, whereby a situation in which infrared light other than the light from the light emitting section 230 is captured as noise can be avoided.

Variations

The embodiments of the invention have been described above, but the invention is not limited to the embodiments described above and can be implemented in a variety of other forms. For example, any of the embodiments described above may be changed as follows, and the invention may be implemented in the changed embodiment. Further, one or more of the embodiments described above and the following variations may be combined with each other, and the invention may be implemented in the combined embodiment.

Variation 1

In the embodiments described above, in which the shutter speed of the imaging section 170 is set, the gain of the imaging device of the imaging section 170, which is another example of the imaging parameters, may be set instead of the shutter speed. For example, in the first embodiment, when the distance from the projector 10 to the screen SC is short, the control section 110 may set the gain of the imaging device at a small value, whereas when the distance from the projector 10 to the screen SC is long, the control section 110 may set the gain of the imaging device at a large value. In the second embodiment, when a result of the evaluation in step SB4 is YES, the control section 110 may set the gain at a small value in step SB6, whereas when a result of the evaluation in step SB4 is NO, the control section 110 may set the gain at a large value in step SB5.

Variation 2

In the embodiments described above, in which the shutter speed of the imaging section 170 is set, the diameter of the opening of the aperture of the imaging section 170, which is another example of the imaging parameters, may be set instead of the shutter speed. For example, in the first embodiment, when the distance from the projector 10 to the screen SC is short, the control section 110 may set the diameter of the opening of the aperture in such a way that the amount of light passing through the aperture decreases, whereas when the distance from the projector 10 to the screen SC is long, the control section 110 may set the diameter of the opening of the aperture in such away that the amount of light passing through the aperture increases. In the second embodiment, when a result of the evaluation in step SB4 is YES, the control section 110 may set the diameter of the opening of the aperture in step SB6 in such a way that the amount of light passing through the aperture decreases, whereas when a result of the evaluation in step SB4 is NO, the control section 110 may set the diameter of the opening of the aperture in step SB5 in such a way that the amount of light passing through the aperture increases.

Variation 3

In the embodiments of the invention, the imaging section 170 may be provided with two imaging devices, and triangulation may be performed based on images captured with the two imaging devices to determine the distance from the projector 10 to the screen SC. Further, in a configuration in which the distance from the projector 10 to an object is determined based on triangulation, the distance from the projector 10 to the pointer 20 may be determined. In the configuration in which the distance from the projector 10 to the pointer 20 is determined based on triangulation, the shutter speed, the gain, or the diameter of the opening of the aperture of the imaging section 170 may be set in accordance with the distance from the projector 10 to the pointer 20. Further, in the configuration in which the distance from the projector 10 to the pointer 20 is determined, for example, the position of the pointer 20 may be detected by using the whiteboard function and the distance to the pointer 20 may further be acquired, and the shutter speed, the gain, or the diameter of the opening of the aperture of the imaging section 170 may be set in accordance with a change in the distance to the pointer 20.

Further, in the embodiments of the invention, the distance from the projector 10 to the pointer 20 may be acquired by acquiring the distance to the screen SC based on a method for capturing a projected image for distance determination or based on a distance sensor, identifying the position of the pointer 20 on the screen SC based on an image captured with the imaging section 170, and using the acquired distance and the identified position of the pointer 20 to determine the distance from the projector 10 to the pointer 20. According to this configuration, the distance from the projector 10 to the pointer 20 can be determined without provision of two imaging devices.

Variation 4

In the embodiments of the invention, video images having brightness specified in advance may be projected on the screen SC, and the shutter speed, the gain, or the diameter of the opening of the aperture of the imaging section 170 may be set based on an image captured with the imaging section 170. For example, when the brightness of the image captured with the imaging section 170 does not fall within a range specified in advance and the brightness is higher than the upper limit of the range, the control section 110 increases the shutter speed of the imaging section 170. In this case, instead of the shutter speed, the gain of the imaging device may be lowered, or the diameter of the opening of the aperture of the imaging section 170 may be so set that the amount of light passing through the aperture decreases. When the brightness of the image captured with the imaging section 170 does not fall within the range specified in advance and the brightness is lower than the lower limit of the range, the control section 110 decreases the shutter speed of the imaging section 170. In this case, instead of the shutter speed, the gain of the imaging section 170 may be increased, or the diameter of the opening of the aperture of the imaging section 170 may be so set that the amount of light passing through the aperture increases.

Variation 5

Figure 14:
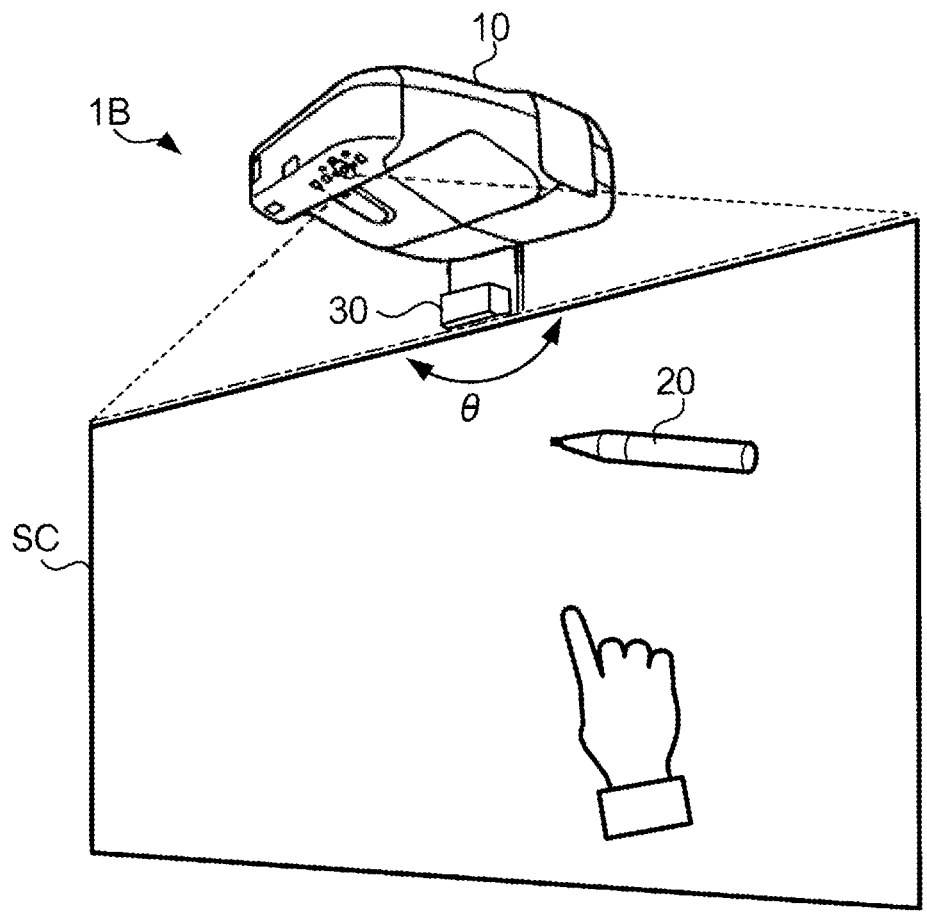
FIG. 14 shows an apparatus that forms a display system according to a variation.

In the embodiments of the invention, a light emitting apparatus that emits light may be provided, and the position of an object that reflects the light from the light emitting apparatus may be detected. FIG. 14 shows an apparatus that forms a display system 1B according to the present variation. The display system 1B includes a light emitting apparatus 30, which is connected to the projector 10. The light emitting apparatus 30 includes a light source that emits light (infrared light in the present variation). The light emitting apparatus 30 is installed in a position above the upper end of the screen SC and outputs diffused light downward over an angular range θ. The light outputted from the light emitting apparatus 30 forms a light layer along the screen SC. In the present variation, the angle θ reaches roughly 180 degrees so that the light layer is formed roughly over the entire screen SC. It is preferable that the light layer formed by the light emitting apparatus 30 is close to the surface of the screen SC.

When a finger, which is an example of the pointer, is caused to approach the screen SC with the light emitting apparatus 30 outputting light, the light outputted from the light emitting apparatus 30 is reflected off the finger. The projector 10 receives the reflected light with the imaging section 170 and identifies the position of the finger. The control section 110 may set the shutter speed at which the imaging section 170 receives the reflected light in accordance with the distance from the projector 10 to the screen SC. Instead, the control section 110 may set the gain of the imaging device in accordance with the distance from the projector 10 to the finger or adjust the amount of light passing through the aperture of the imaging section 170 by changing the diameter of the opening of the aperture. Further, the control section 110 may cause the imaging section 170 to capture the light reflected off the finger and when the area of a region where the reflected light is displayed does not fall within an area range specified in advance and the area is greater than the upper limit of the range, the control section 110 may increase the shutter speed of the imaging section 170, whereas when the area is smaller than the lower limit of the range, the control section 110 may decrease the shutter speed of the imaging section 170. Further, the control section 110 may cause the imaging section 170 to capture the light reflected off the finger and set the gain of the imaging device in accordance with the area of the region where the reflected light is displayed, or may set the amount of light passing through the aperture of the imaging section 170 by changing the diameter of the opening of the aperture.

What is claimed is:

1. A projector that projects video images on a projection surface, the projector comprising:
    an imaging device that generates an image of the projection surface which is pointed with a pointer; and
    at least one processor that executes one or more programs to realize one or more functions of:
        a position detection section that detects a position of the pointer based on the image generated by the imaging device;
        an acquisition section that acquires information on a distance from the projector to the pointer or the projection surface; and
        a change section that changes an imaging parameter of the imaging device relating to brightness of the image generated by the imaging device in accordance with the information acquired by the acquisition section,
    wherein the change section changes the imaging parameter in such a way that the brightness of the image generated by the imaging device increases as the distance to the pointer or the projection surface increases.

2. The projector according to claim 1,
    wherein the change section changes the imaging parameter in such a way that the brightness of the image generated by imaging device increases as the distance to the pointer or the projection surface increases.

3. The projector according to claim 1,
    wherein the imaging parameter is a light exposure period for which the imaging device performs imaging.

4. The projector according to claim 1,
    wherein the imaging parameter is a gain in accordance with which the imaging device performs imaging.

5. The projector according to claim 1,
    wherein the imaging parameter is a diameter of an opening of an aperture that limits light incident on the imaging device.

6. The projector according to claim 1,
    further comprising a measurement device that measures the distance,
    wherein the change section changes the imaging parameter in accordance with the distance measured by the measurement device.

7. The projector according to claim 6,
    wherein the measurement device measures a distance to the projection surface.

8. The projector according to claim 6,
    wherein the measurement device measures a distance to the pointer.

9. The projector according to claim 1,
    wherein the change section changes the imaging parameter in accordance with a position detected with the position detection section.

10. A projector that projects video images on a projection surface, the projector comprising:
    an imaging device that generates an image of the projection surface which is pointed with a pointer; and
    at least one processor that executes one or more programs to realize one or more functions of:
        a position detection section that detects a position of the pointer based on the image generated by the imaging device;
        a change section that changes an imaging parameter of the imaging device relating to brightness of the image generated by the imaging device in such a way that in the image generated by the imaging device, an area of a region of light emitted by the pointer falls within a range specified in advance,
    wherein the change section changes the imaging parameter in such a way that the brightness of the image generated by the imaging device increases as the distance to the pointer or the projection surface increases.

11. A method for controlling a projector, the method comprising:
    generating an image of a projection surface which is pointed with a pointer and on which video images are projected;
    detecting a position of the pointer based on the image generated in the generating of an image;
    acquiring information on a distance from the projector to the pointer or the projection surface; and
    changing an imaging parameter of the generating of the image relating to brightness of the image generated in the generating of the image in accordance with the information acquired in the acquiring of information,
    wherein, in the changing of the imaging parameter, the imaging parameter is changed in such a way that the brightness of the image generated increases as the distance to the pointer or the projection surface increases.

12. A method for controlling a projector, the method comprising:
- generating an image of a projection surface which is pointed with a pointer and on which video images are projected;
- detecting a position of the pointer based on the image generated in the generating of an image; and
- changing an imaging parameter of the generating of the image relating to brightness of the image generated in the generating of the image in such a way that in the image generated in the generating of the image, an area of a region of light emitted by the pointer falls within a range specified in advance,
- wherein, in the changing of the imaging parameter, the imaging parameter is changed in such a way that the brightness of the image generated increases as the distance to the pointer or the projection surface increases.

* * * * *